June 8, 1937.  R. A. RIESGO  2,082,975
BEVERAGE SERVING APPARATUS
Filed Nov. 14, 1936    2 Sheets-Sheet 1
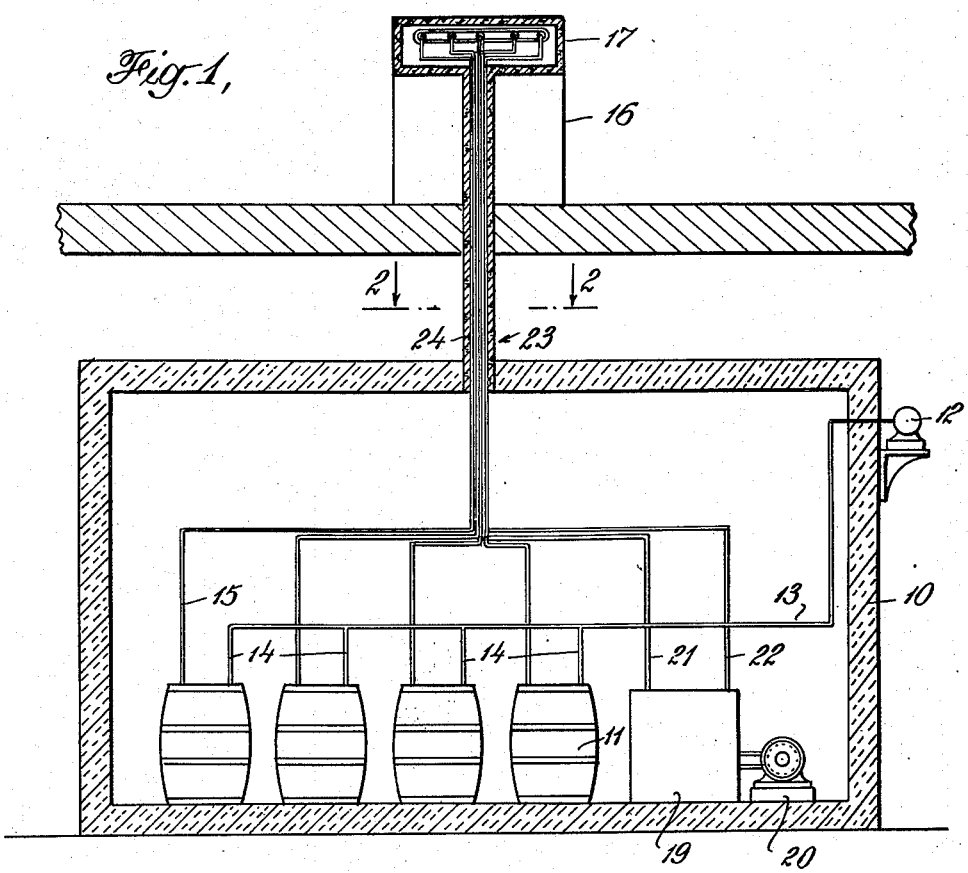
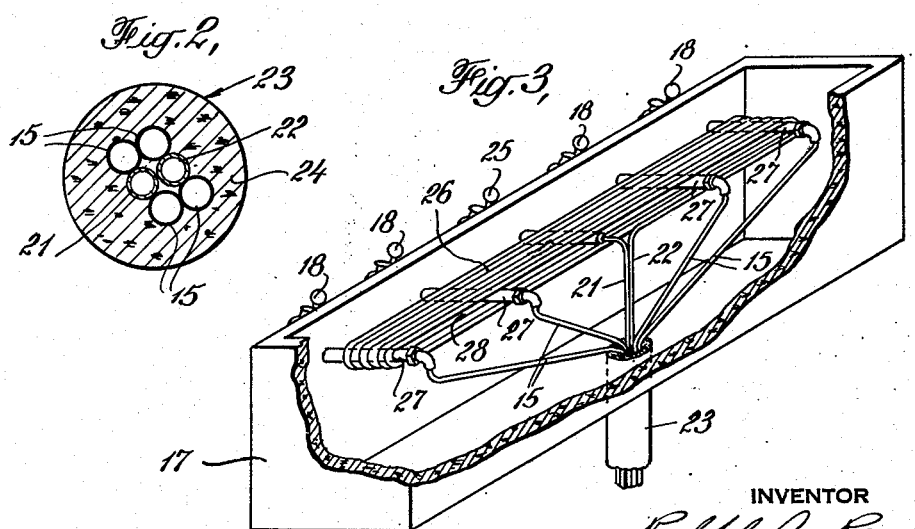
INVENTOR
Ralph A. Riesgo
BY
ATTORNEYS

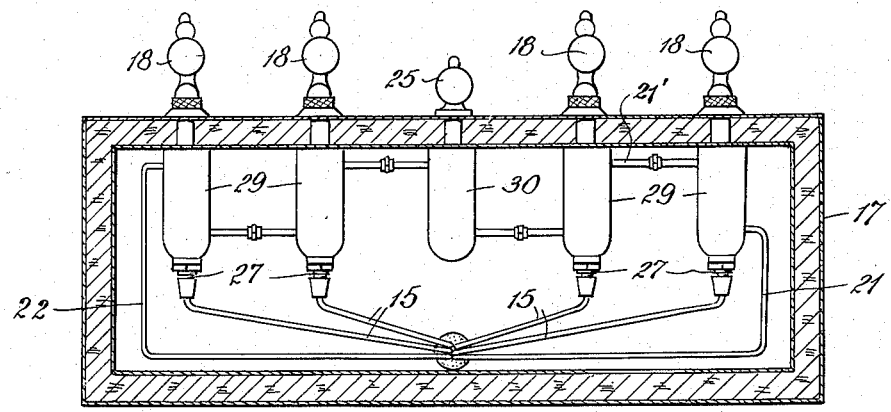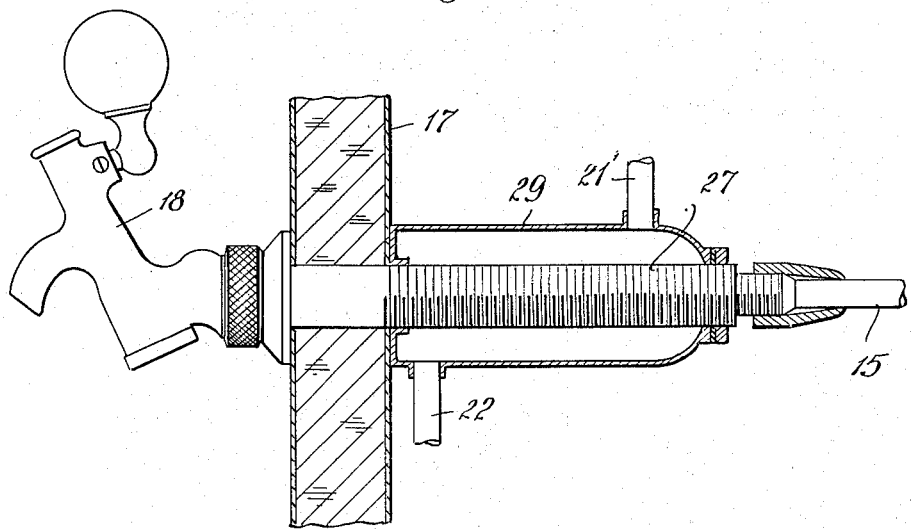

Patented June 8, 1937

2,082,975

UNITED STATES PATENT OFFICE 2,082,975

BEVERAGE SERVING APPARATUS

Ralph A. Riesgo, New York, N. Y.

Application November 14, 1936, Serial No. 110,782

REISSUED

18 Claims. (Cl. 225—1)

This invention relates to beverage serving apparatus and has particular reference to a system for efficiently and effectively maintaining the predetermined temperature of a beverage from storage to the place where it is to be served.

The invention is equally adaptable to maintaining the temperature of both hot and cold beverages, and by way of illustration, the application of the invention to maintaining the temperature of beer precooled will be described.

A common way of cooling beer for serving purposes is to pre-cool the keg of beer in an icebox in the basement or elsewhere and convey the cooled kegs to the bar when a new supply is required, or, alternatively, to pipe the uncooled beer from the kegs in the cellar to an iced or mechanically refrigerated cooler at the bar. More recently, an arrangement has been provided whereby the beer is piped from kegs in a pre-cooling chamber in the basement or other nearby place and the air from the pre-cooler is circulated around the pipes within insulated tubes. This system is reasonably satisfactory where the distance from the pre-cooler to the cooler in the bar is very short and direct, but where the distance is relatively long the circulation of the air has not been sufficiently uniform or effective to effectively cool the beer.

In accordance with the present invention, a beverage serving apparatus or system is provided in which the temperature of the beverage, such as beer, is preferably maintained at the proper cool degree by a novel arrangement of circulating icewater which is served at the bar and which is effective even where the pre-cooler in the basement or elsewhere is located at a considerable distance from the bar, and thus not only are air-cooling ducts and the like dispensed with but effective cooling is secured without the necessity of providing special mechanical refrigerating systems for maintaining the beer cool in transit and for keeping the beer cool at the bar until it is served.

More particularly, the apparatus or system of this invention includes the usual pre-cooling chamber in the basement or elsewhere in which the kegs of beer are located and from which the beer is piped from the kegs to the bar, along with continuously circulating icewater from a suitable cooling source in the pre-cooler or elsewhere, the icewater pipes being nested with the beer pipes within an insulated jacket leading to the usual icewater tap at the bar. With this arrangement, the separately-cooled pre-cooler at the bar is dispensed with and in one form of the arrangement of this invention, the icewater pipes are wrapped around the pipes leading to the beer faucets within a pre-cooling chamber at the bar so that the continuously circulating icewater maintains the beer cool within the pipes leading to the faucets. In an alternative arrangement, the icewater is circulated through a series of individual jackets for each of the pipes leading to the beer faucet within a pre-cooling chamber, the series of connections between adjacent jackets being so arranged that the icewater flows longitudinally of the beer pipes, entering each jacket at one end and flowing out at the opposite end.

It will be seen that this arrangement for keeping beer or other beverages cool is simple and particularly economical, as icewater must always be available at the bar. In addition to the convenience and economy, the use of icewater for the purpose described avoids the objections to cooling with circulating refrigerants, brines or the like, which cause difficulties in the event of leakage, and with brine and the like additional difficulties are frequently encountered because of freezing of the beer, corrosion of the pipes, precipitation of salts therein, and the like.

For a more complete understanding of the invention, reference may be had to the accompanying drawings, in which:

Figure 1 is an elevation of the beer serving system embodying apparatus of this invention;

Fig. 2 is an enlarged section through the single supply pipe leading to the bar, and containing the icewater and beer lines, as seen along the line 2—2 of Fig. 1;

Fig. 3 is a perspective view of the interior of the coil compartment at the bar;

Fig. 4 illustrates a modified form of cooling arrangement at the bar; and

Fig. 5 is an enlarged section through one of the cooling jackets employed in the last named arrangement.

Referring to Fig. 1 of the drawings, numeral 10 designates an insulated pre-cooling chamber located in the basement or elsewhere and suitably cooled by mechanical refrigeration or the like. The kegs 11 containing beer or other beverage to be served are located within pre-cooler 10. A conventional pressure pump 12, suitably positioned on the wall of the pre-cooler 10 as shown or elsewhere, maintains through pipe 13 and connections 14 to the kegs 11 a pressure of air or other gas on the beer in the kegs 11 so that the beer is forced through pipes 15 to the bar 16 located on the floor above the pre-cooler or elsewhere in the usual way. The beer pipes preferably lead through an insulated compartment 17 at the bar and the beer is served from the usual faucets 18.

Preferably located within the pre-cooler 10 is a suitable icewater cooler 19 of considerable cooling capacity and provided with a circulating pump 20. The icewater cooler 19 may be located elsewhere and be separately cooled if desired, or the icewater may be cooled by coils running along the wall of the pre-cooler 10, or in any other suitable way. The circulating icewater pipes 21 and 22, one of which, 21, may be the supply and the other, 22, the return, are bunched with the beer pipes 15 within an insulated jacket 23 which leads to the compartment 17 at the bar as indicated in Figs. 1 and 3.

As illustrated in the enlarged section of Fig. 2, the beer lines 15, which may be four in number, are positioned in close contact with and surround the icewater circulating pipes 21 and 22, and all pipes 15, 21 and 22, are surrounded by insulating material 24, such as cork, mineral wool, or the like, packed within jacket pipe 22. The pipes 15, 21 and 22, enclosed in a preformed insulating jacket of any conventional form are preferably formed of highly conductive material, such as block tin, so that the interchange of heat is rapid and effective as between the beer within pipes 15 and the icewater within pipes 21 and 22. The duct 23 may be as long as is necessary and may take any form, depending upon requirements, the form having no effect on the efficiency of the cooling, for the icewater within pipes 21 and 22 circulates continuously at a rate such that its temperature is substantially uniform, and its average temperature is at or below that desired for the beer at the bar. The icewater pipes 21 and 22 lead to the compartment 17 at the bar and one of them is connected to the usual icewater tap 25 at the bar.

In a preferred arrangement, the icewater pipes 21 and 22 terminate in a coil 26 of high conducting material, such as flexible copper tubing and is wrapped around and in close contact with the beer pipes 27 extending between supply pipes 15 and faucets 18. The material of which pipes 27 is made is also highly heat-conductive, such as block tin, and as the tubes forming coil 26 are in close heat-transferring contact with pipes 27 and form a long narrow chamber 28 in which pipes 27 are located, the beer in the latter is effectively and uniformly cooled. The radiating area of coil 26 is relatively great in respect to the cubical content of compartment 17, so that the latter is also uniformly cooled, whereby the beer in that portion of the pipes 15 between the jacket pipe 23 and the pipes 27 is also kept cool.

In the modified arrangement of the bar compartment 17 illustrated in Figs. 4 and 5, the individual beer pipes 27 leading to the faucets 18 are enclosed in jackets 29, which may be cast aluminum or the like, and threaded on to the pipes 27, as is illustrated in the enlarged section of Fig. 5. The icewater entering the compartment 17 through pipe 21 is introduced into one end of one of the jackets 29 in the manner illustrated in Fig. 4. The icewater is led from the opposite end of jacket 29 by pipe 21' to the corresponding end of adjacent jacket 29 and so on to the icewater discharge pipe 22, the water circulating longitudinally of the pipes 27 as it enters one end of the jacket and discharges at the other end. The ice water tap 25 is connected to a separate container 30 similar to jackets 29 but of course containing no pipe to be cooled and serving merely as a reservoir for the circulating ice water. In this way the ice water circulates constantly around the pipes 27 and the cooling action is very effective for removing the heat that is ordinarily absorbed by the beer in transit to the serving place, so that the beer is supplied and maintained cool at the serving place. The cooling ice water, both supply and return, is circulated at such a rate that its average temperature is at or below that desired at the serving place. If desired, baffles such as spiral strips wound around pipe 27 or spiral fins within jackets 29 may be provided to direct the cooling water in a particular path.

Although there has been illustrated and described herein only one method of precooling the beer, i. e., in a precooler 10, the invention is equally applicable for maintaining the beer cool after it has been precooled by other common means, such as running a cooling medium through a coil thrust into the keg and the like where the cooling medium may be ice water or other fluid, the circulating pipes of which may be run in heat-transferring contact with the beer lines to the serving place in the manner described.

Operation of the apparatus of this invention will be readily understood from the foregoing explanation. Although certain preferred embodiments of the invention have been illustrated and described herein, it is to be understood that the invention is not limited thereby but is susceptible of changes in form and detail within the scope of the appended claims. Thus, inasmuch as the system maintains the temperature of a beverage, it may be adapted for maintaining the original temperature of warm or hot beverages as well as cool or cold beverages during their transit through a medium which ordinarily absorbs some heat therefrom or adds heat thereto.

I claim:

1. In a beverage serving apparatus, the combination of a plurality of beverage supply pipes, cooling medium supply and return pipes in heat-transferring contact with said beverage supply pipes, and a heat insulating jacket jointly enclosing said beverage and cooling medium supply and return pipes.

2. In a beverage serving apparatus, the combination of a plurality of beverage supply pipes, cooling medium supply and return pipes in heat-transferring contact with said beverage supply pipes, an insulated serving compartment into which said pipes lead, cooling means surrounding said beverage pipes within said compartment, and connections between said cooling means and said cooling medium supply and return means.

3. In a beverage serving apparatus, the combination of a plurality of beverage supply pipes, cooling medium supply and return pipes in heat-transferring contact with said beverage supply pipes, an insulated serving compartment into which said pipes lead, a cooling coil surrounding said beverage pipes within said compartment, and connections between said coil and said cooling medium supply and return pipes.

4. In a beverage serving apparatus, the combination of a plurality of beverage supply pipes, cooling medium supply and return pipes in heat-transferring contact with said beverage supply pipes, an insulated serving compartment into which said pipes lead, individual serving pipes connected to said beverage pipes and located within said compartment, a coil within said compartment jointly surrounding said serving pipes and in heat-transferring contact therewith, and connections between opposite ends of said coil and said cooling medium supply and return pipes.

5. In a beverage serving apparatus, the combination of a plurality of beverage supply pipes, cooling medium supply and return pipes in heat-transferring contact with said beverage supply pipes, an insulated serving compartment into which said pipes lead, individual serving pipes connected to said beverage pipes and located within said compartment, a coil within said compartment extending around the outermost serving pipes and enclosing other serving pipes within its interior, and connections between opposite ends of said coil and said cooling medium supply and return pipes.

6. In a beverage serving apparatus, the combination of a plurality of beverage supply pipes, cooling medium supply and return pipes in heat-transferring contact with said beverage supply pipes, an insulated serving compartment into which said pipes lead, jacket means enclosing said beverage pipes within said compartment, and connections between said jacket means and said cooling medium supply and return pipes.

7. In a beverage serving apparatus, the combination of a plurality of beverage supply pipes, cooling medium supply and return pipes in heat-transferring contact with said beverage supply pipes, an insulated serving compartment into which said pipes lead, a jacket enclosing each beverage pipe within said compartment, connections between said jackets, and connections between said jackets and said cooling medium supply and return pipes.

8. In a beverage serving apparatus, the combination of a plurality of beverage supply pipes, cooling medium supply and return pipes in heat-transferring contact with said beverage supply pipes, an insulated serving compartment into which said pipes lead, a jacket enclosing each beverage pipe within said compartment, series connections between said jackets, a connection between the first jacket of said series and said cooling medium supply pipe, and a connection between the last jacket of said series and said cooling medium return pipe.

9. In a beverage serving apparatus, the combination of a plurality of beverage supply pipes, cooling medium supply and return pipes in heat-transferring contact with said beverage supply pipes, an insulated serving compartment into which said pipes lead, at least two individual serving pipes connected to said beverage pipes and located within said compartment, an elongated jacket enclosing each of said serving pipes, a connection between one end of one of said jackets and said cooling medium supply pipe, a connection between the opposite end of said one jacket and one end of the other jacket, and a connection between the opposite end of said other jacket and said cooling medium return pipe.

10. In a beverage serving system, the combination of a source of beverage supply, pipes leading therefrom to the serving place, a source of ice water supply, a supply pipe leading from said ice water source to the serving place, a return ice water pipe connected to said ice water supply pipe and leading from the serving place to said ice water source, and insulating means enclosing said beverage and ice water pipe in intimate heat-transferring contact, whereby the circulating ice water cools the beverage in said pipes.

11. In a beverage serving system, the combination of a source of beverage supply, pipes leading therefrom to the serving place, a source of ice water supply, a supply pipe leading from said ice water source to the serving place, a return ice water pipe connected to said ice water supply pipe and leading from the serving place to said ice water source, and an insulating jacket for said pipes in which the ice water pipes are nested between said beverage pipes and in heat-transferring contact therewith.

12. In a beverage serving system, the combination of a source of beverage supply, pipes leading therefrom to the serving place, a source of ice water supply, a supply pipe leading from said ice water source to the serving place, a return ice water pipe connected to said ice water supply pipe and leading from the serving place to said ice water source, said beverage and ice water pipes being positioned in heat-transferring contact, a coil surrounding said beverage pipes at the serving place, and connections between said coil and said ice water supply and return pipes.

13. In a beverage serving system, the combination of a source of beverage supply, pipes leading therefrom to the serving place, a source of ice water supply, a supply pipe leading from said ice water source to the serving place, a return ice water pipe connected to said ice water supply pipe and leading from the serving place to said ice water source, said beverage and ice water pipes being positioned in heat-transferring contact, jacket means enclosing said beverage pipes at the serving place, and connections between said jacket means and said ice water supply and return pipes.

14. In a beverage serving system, the combination of a source of beverage supply, pipes leading therefrom to the serving place, a source of ice water supply, a supply pipe leading from said ice water source to the serving place, a return ice water pipe connected to said ice water supply pipe and leading from the serving place to said ice water source, an insulated compartment at the serving place into which said pipes lead, cooling means in said compartment for said beverage pipes, and connections between said cooling means and said ice water supply and return pipes.

15. In a beverage serving system, the combination of a source of beverage supply, pipes leading therefrom to the serving place, a source of ice water supply, a supply pipe leading from said ice water source to the serving place, a return ice water pipe connected to said ice water supply pipe and leading from the serving place to said ice water source, said ice water and beverage pipes being in coextensive heat-transferring contact to the serving place, an insulating jacket enclosing said pipes, an insulated compartment into which said pipes lead cooling means for said beverage in said compartment, and connections between said ice water supply and return pipes and said cooling means for cooling the latter.

16. In a beverage serving system, the combination of a source of beverage supply, means for cooling the beverage at said source, a beverage supply pipe leading from said source to the serving place, cooling medium supply and return pipes leading from said cooling means to said serving place, said cooling medium supply and return pipes both being in heat-transferring contact with said beer supply pipe, and means for continuously circulating a cooling medium through said cooling medium supply and return pipes.

17. In a beverage serving system, the combination of a source of pre-cooled beverage supply, a beverage supply pipe leading from said source to the serving place, cooling medium supply and return pipes, insulating jacket means inclosing said beverage and cooling medium supply and return pipes in coextensive heat-transferring association, and means for circulating a cooling medium through said cooling medium supply and return pipes.

18. In a system for supplying a beverage at a selected temperature to a serving place, the combination of a remote source of supply of the beverage at approximately said selected temperature, a beverage pipe leading from said source to the serving place, a supply pipe and a return pipe, both in heat-transferring contact with said beverage pipe, an insulating covering for all of said pipes, and means for circulating through said supply and return pipes a fluid for maintaining the beverage in said beverage pipe at approximately said selected temperature from said source to the serving place.

RALPH A. RIESGO.